United States Patent [19]

Anderson

[11] Patent Number: 5,062,446
[45] Date of Patent: Nov. 5, 1991

[54] INTELLIGENT MASS FLOW CONTROLLER

[75] Inventor: Richard L. Anderson, Austin, Tex.

[73] Assignee: Sematech, Inc., Austin, Tex.

[21] Appl. No.: 638,279

[22] Filed: Jan. 7, 1991

[51] Int. Cl.[5] ............................................. G05D 7/06
[52] U.S. Cl. ................................... 137/468; 137/486; 137/487.5
[58] Field of Search ...................... 137/468, 486, 487.5

[56] References Cited

U.S. PATENT DOCUMENTS

| | | | |
|---|---|---|---|
| 4,813,443 | 3/1989 | Pounder | 137/486 X |
| 4,866,940 | 9/1989 | Hwang | 137/487.5 X |
| 4,873,873 | 10/1989 | Day | 137/486 X |
| 4,976,144 | 12/1990 | Fitzgerald | 137/487.5 X |

OTHER PUBLICATIONS

The Journal of Vacuum Science and Technology, May/Jun. 1990, "Toward Understanding the Fundamental Mechanisms and Properties of the Thermal Mass Flow Controller", L. D. Hinkle, C. F. Mariano.
Sierra Instruments Brochure, 1987, "Process Gas Mass Flow Controllers and Meters", Sierra's Side-Trak TM, Series 840 and 830.
Journal of Scientific Instruments, 1968, "Thermal Methods of Flow Measurement", Series 2, vol. 1, P. Bradshaw.
IEEE Transactions on Instrumentation, Dec. 1974, "Standard Cell Enclosure with 20 -$\mu$K Stability", vol. IM-23, No. 4; Robert Cutkosky, B. Field.
Semiconductor International, Sep. 1988, "Watch Your Vacuums and RF by PC to Make Your Process Repeatable," Brian Chapman et al.
Control Engineering, May 1985, "Thermal Mass Flowmeters", pp. 150–158, Brian C. Waters.

Primary Examiner—Alan Cohan
Attorney, Agent, or Firm—William W. Kidd

[57] ABSTRACT

An intelligent mass flow controller for controlling the mass flow of gas to a semiconductor processing chamber. A sensing circuit measures a difference in temperature across a sensing tube and translates this difference to adjust a valve for controlling the mass flow. A microcontroller which includes a CPU, signal processing and software routines continually monitors the various parameters and provide "on the fly" corrections, as well as providing diagnostics and record retention.

18 Claims, 3 Drawing Sheets

INTELLIGENT MASS FLOW CONTROLLER

BACKGROUND OF THE INVENTION

1. Field of the Invention

The present invention relates to the field of manufacturing control devices and, more particularly, to a process gas controller for use in semiconductor processing.

2. Prior Art

In the manufacture of semiconductor integrated circuit devices, various circuit elements are formed in or on a base substrate, such as a silicon substrate. Various processes for forming these integrated circuit devices are well known in the prior art. In performing some of these steps, a semiconductor wafer is placed in a reactor chamber in order for the wafer to undergo certain necessary processing steps, which may include steps for depositing or etching various layers of the wafer. After these wafers are loaded into a given chamber, the wafer is subjected to one or more of a variety of gases, liquids and/or plasma during a given process cycle period. In order to ensure proper processing of these wafers, a number of chamber parameters must be tightly controlled. One critical parameter is the amount and composition of the fluid introduced into the chamber for a given processing step.

In order to control the amount and composition of the fluid being introduced into the processing chamber, various tools and schemes have been devised to control the fluid flow to the reactor chamber. One commonly used device is a mass flow controller, which controls the amount (mass) of the fluid being introduced into the chamber.

Most prior art mass flow controllers typically require an external control box to generate a set point signal for gas control, and provide the power for the sensor electronics and the control valve. The mass flow controller adjusts the flow control valve opening so that the flow through the flow sensor matches the set point valve provided by the controller. Most of these control boxes are provided with a computer interface to integrate the mass flow controller into an automated process control system.

Although the prior art technique may be adequate for many prior art processing techniques, it has significant drawbacks for state of the art techniques for fabricating devices utilizing submicron technology. The state-of-the-art submicron technology, utilized for manufacturing devices which have device dimensions and/or line dimensions of less than 1 micron, require that reactor chamber tolerances be controlled to much tighter specifications, which one specification is the amount of the gas being introduced into the chamber.

The characteristics of prior art mass flow controllers change with time due to aging and can result in increasing errors in the gas flow. Aging of any of three elements:>the flow sensor, the mass flow controller's on-board electronics, and the control valve can cause mass flow controller drift. In addition, with some corrosive or reactive gases, critical flowmeter dimensions can be changed which will also cause mass flow controller drift.

Accordingly, it is appreciated that the self-correcting mass flow controller, which can correct the mass flow of the fluid to the chamber during use, will provide a more reliable mechanism to control the fluid provided to the processing chamber.

SUMMARY OF THE INVENTION

An intelligent mass flow controller for controlling the mass flow of gas into a semiconductor processing chamber is described. The mass flow controller is comprised of a flow meter having a sensing tube for measuring a gas flow through the flow meter and an adjustable valve in which the amount of flow through the meter is controlled. The sensing circuitry coupled to the sensing tube utilizes a balanced bridge to detect a difference in temperature across the sensing tube which difference in temperature is proportionally related to the amount of gas flow through the flow meter.

Various circuit parameters associated with the flow meter are monitored and provided as inputs to a microcontroller for processing. The microcontroller includes a CPU in order to provide the intelligence at the flow meter, instead of at the host unit which it is coupled to. The microcontroller also includes a signal processor to process the various input signals, as well as a number of routines to provide calibration, diagnostics, and correction to the gas flow in response to the various monitored signals.

A data bus couples the microcontroller to a host or a sensor network. However, communication between the microcontroller and the host unit are maintained at a minimum since the intelligence is resident on the flow controller unit itself.

DETAILED DESCRIPTION OF THE PREFERRED EMBODIMENT

An intelligent mass flow controller for controlling the amount of fluid flow into a semiconductor processing chamber is described. In the following description, numerous specific details are set forth, such as specific devices, measuring techniques, circuitry, etc., in order to provide a thorough understanding of the present invention. However, it will be obvious to one skilled in the art that the present invention may be practiced without these specific details. In other instances, well-known processes and structures have not been described in detail in order not to unnecessarily obscure the present invention.

Prior Art

Figure 1:
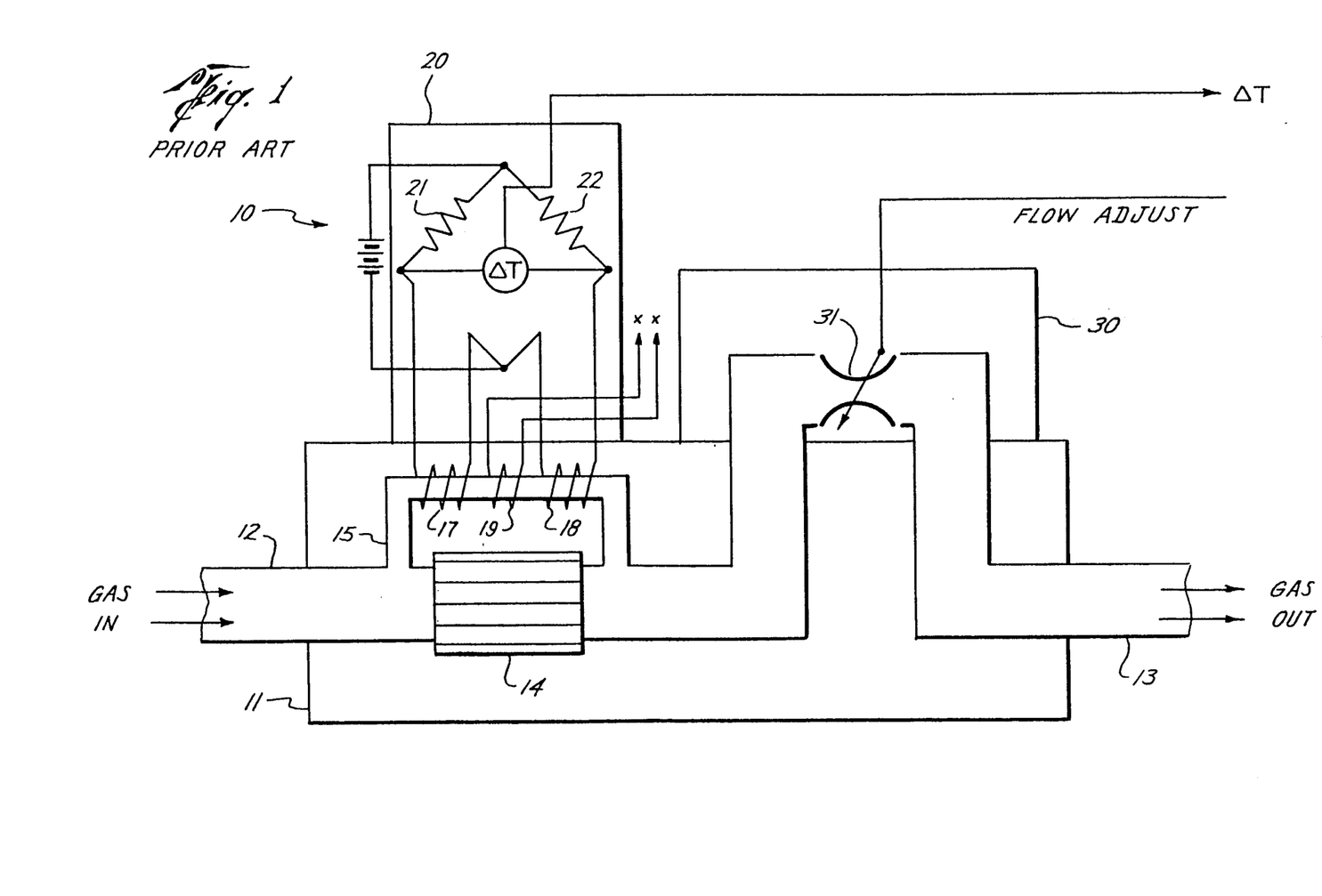
FIG. 1 is a block diagram of a prior art mass flow controller.

Referring to FIG. 1, a diagram of a prior art mass flow device 10 is shown. Device 10 is comprised of three main assemblies, namely, a flow meter 11, sensor 20 and flow adjustment unit 30. Gas from a gas source is coupled to an inlet 12 of meter 11 while an outlet 13 from meter 11 is coupled to a gas destination, such as a semiconductor processing chamber.

In order to cover a wide range of flows in the range of approximately 10 SCCM to 50,000 SCCM, the gas stream is divided in a fixed ratio between the sensor tube 15 and the main flow channel.

A laminar flow device 14 is inserted in series to the main gas flow in order to establish a pressure difference across it. The flows in both the sensor tube 15 and the main flow channel must be kept in the laminar flow regime to maintain a fixed flow ratio between them. A sensing tube 15 is coupled in parallel across device 14 in order to measure the mass flow of the gas through meter 11. Typically, the diameter of sensing tube 15 is made substantially smaller than the diameter of the channel carrying the main flow of the gas through device 14, such that a small percentage of the gas is actually routed through sensing tube 15 and most of the gas bypasses tube 15. Because of the construction of device 14 to provide a laminar flow, a pressure difference occurs across sensing device 14, thereby also presenting a pressure difference across sensing tube 15. This pressure difference causes a fixed ratio of the total amount of the gas flow to flow through sensing tube 15. By selecting proper design criteria for the physical construction of device 14 and tube 15 and ensuring that the sensing tube 15 and laminar flow device 14 are sized to maintain laminar flow over the range of use, the total gas flow across meter 11 can be determined by measuring the gas flow through sensing tube 15.

Subsequently to the device 14 and tube 15, the gas flow is channeled into a flow valve 31 of assembly 30 before being channeled out at outlet 13. Valve 31 is a variable adjustment valve which can be readily adjusted to control the amount of gas flow to outlet 13. The adjustment of valve 31 can be provided either manually, such as by mechanical screws, or automatically, such as by electrical control, depending on the actual device used. One preferred device is a solenoid valve which opening can be controlled, as well as varied, electrically. Another device for moving the valve stem uses the voltage applied to a stack of piezoelectric material.

Although a number of prior art devices can be utilized to measure the flow of the gas through device 10, device 10 employs one of the simplest, yet accurate of techniques. A first coil 17 is wrapped around a portion of sensing tube 15, while a second coil 18 is wrapped around a portion of tube 15 located downflow from coil 17. Disposed between the two coils 17 and 18 is a third coil 19, which is used to provide heat energy to the gas flowing through tube 15. It is to be appreciated that coils 17-19 are shown and described above as wrapped around the sensing tube 15, but in practice these coils 17-19 need not necessarily be wrapped about tube 15. These coils 17-19 can be adjacent or otherwise proximate to corresponding sections of the tube. Furthermore, resistive elements can be readily used for coils 17-19. Additionally, coils 17-18 are made from materials with an appreciable temperature coefficient of resistance to serve as thermometers, while coil 19 has a small temperature coefficient and serves as a heater.

The ends of the two coils 17-18 are coupled to the sensor assembly 20. One end of coil 17 is coupled to one end of coil 18, while the other end of coils 17 and 18 are coupled to nodes 23 and 24, respectively. A resistor network comprised of resistors 21 and 22 is coupled across nodes 23 and 24. The coils 17 and 18 and resistor 21 and 22 are configured to provide a balanced bridge network. Changes in the resistance of coils 17 and 18, which changes tend to be in the opposite direction, will unbalance the bridge resulting in the signal that is proportional to $\Delta T$. The $\Delta T$ (difference in temperature) reading, taken across nodes 23 and 24, is provided as an output from assembly 20. The two ends of heater coil 19 are coupled to an electrical source when applied causes heater coil 19 to supply heat energy to heat the gas in the tube 15.

Figure 2:
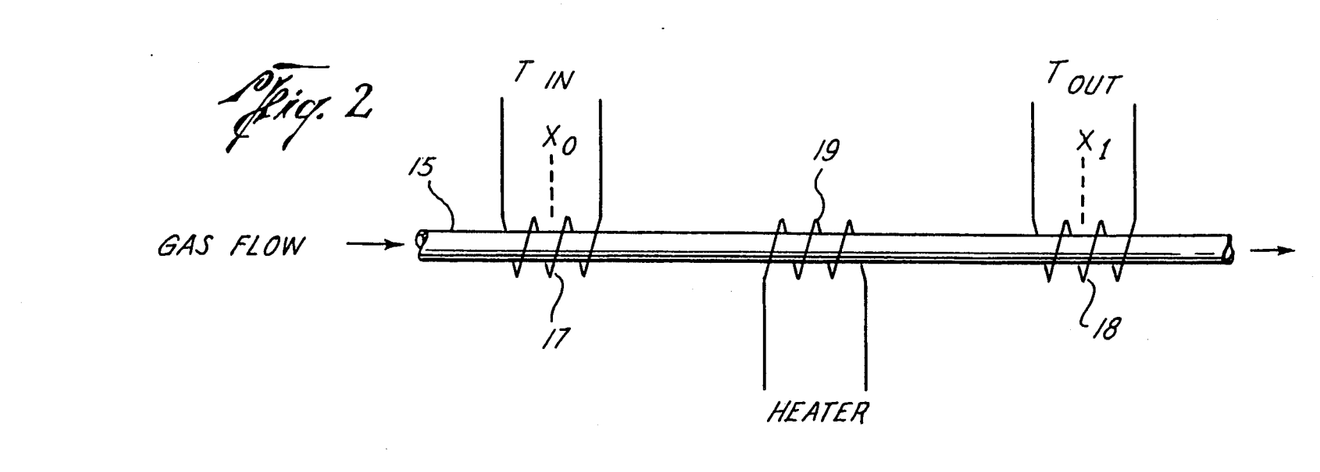
FIG. 2 is a schematic diagram showing the positioning of three coils about a sensing tube which are used to determine the flow of the gas by measuring a temperature difference across the coils.
Figure 3:
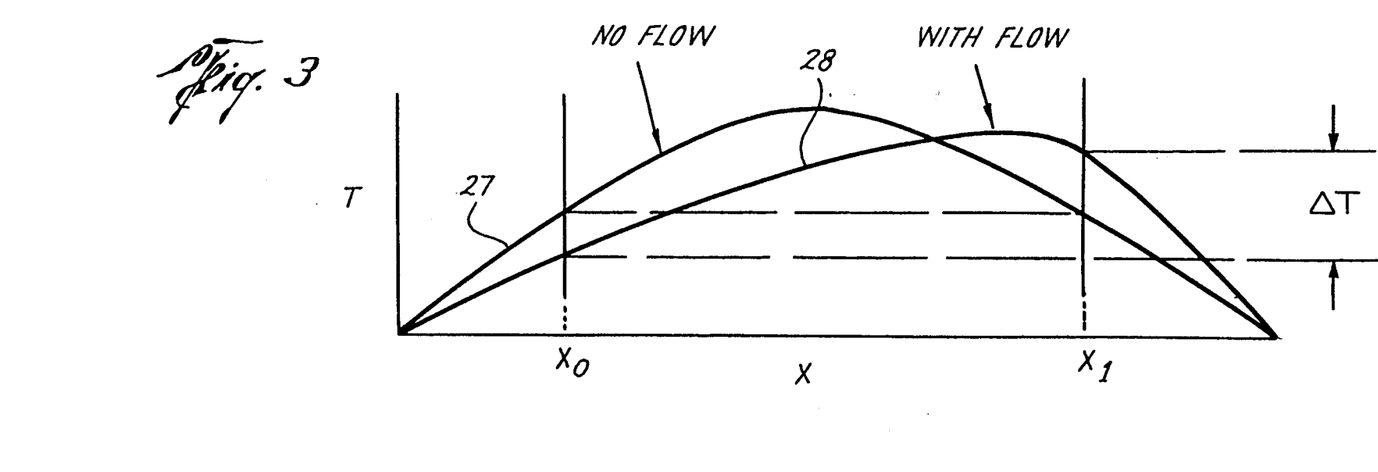
FIG. 3 is a graphical representation of temperature versus distance for measuring the temperature difference across the coil configuration shown in FIG. 2.

The operation of sensing tube 15 and its associated coils 17-19 to measure the flow of the gas in tube 15 is better illustrated in reference to FIGS. 2 and 3. Referring to FIGS. 2 and 3, FIG. 2 shows the position of the various coils 17-19 about sensing tube 15, while FIG. 3 shows the accompanying temperature (T) versus distance (X) graph pertaining to the diagram of FIG. 2. In the diagrams, the input side coil 17 is disposed at distance $X_0$, while the output side coil 18 is disposed at a relative distance $X_1$. The heater coil 19 is disposed midway between $X_0$ and $X_1$.

Without any gas flow through tube 15, such as the case when valve 31 of FIG. 1 is completely closed. The heater 19 will heat the stationary gas in tube 15 resulting in the temperature curve 27 of FIG. 3. As can be seen from curve 27, the highest temperature is encountered at the position of the heating coil 19, which is midway between $X_0$ and $X_1$. The temperatures at positions $X_0$ and $X_1$ are substantially equal, such that $T_{IN}$ is equal to $T_{OUT}$. Thus, the input and output temperatures ($T_{IN}$ and $T_{OUT}$, respectively) as detected by coils 17 and 18, detect a $\Delta T$ of zero. It is to be noted that the coils 17 and 18 do not actually detect temperature. Rather, the variation in the resistance of each of the coils caused by the presence of heat causes the current through the coils to vary. This change in current is measured by the bridge network.

However, when there is gas flow in tube 15, the actual flow of the gas causes the maximum temperature point to be physically displaced toward the downflow coil 18, as exemplified by curve 28 of FIG. 3. The peak shift toward $X_1$ in FIG. 3 is due to the gas flow occurring from $X_0$ toward $X_1$ and the amount of the shift is dependent on the actual flow rate of the gas between $X_0$ and $X_1$. With the shifting of the curve, the curve is no longer symmetrical thereby resulting in a lower temperature at $X_0$ and a higher temperature at $X_1$. This difference in temperature at $X_0$ and $X_1$ is defined as the difference temperature $\Delta T$, which is a direct function of the amount of gas flow between $X_0$ and $X_1$. Thus, by measuring $\Delta T$, the actual gas flow through tube 15 can be measured, provided that other parameters are held constant. Accordingly, utilizing this principle, the prior art device 10 of FIG. 1 can readily measure $\Delta T$ across coils 17 and 18 which $\Delta T$ value provides a direct indication of the total gas flow out of outlet 13.

In mathematical terms, FIGS. 2 and 3 provide the following. Starting with a much simplified model, with a power P into the gas, the mass flow rate $Q_M$ can be obtained from $$Q_M = \frac{P}{C_P(T_{OUT} - T_{IN})} \quad \text{(Equation 1)}$$

where $C_P$ is the specific heat of the particular gas. In a practical meter this expression must be multiplied by a calibration factor for the specific meter under consideration. Practice has shown that each meter is sufficiently different to require calibration. Ideally, the meter should be calibrated with the gas with which the meter is intended to be used. Practical considerations require that mass flow controllers be calibrated with non-corrosive, non-toxic gases. The inert gas calibration is converted to that for another gas by a correction factor supplied by the meter manufacturer.

$$Q_x = Q_{cal}\frac{K_x}{K_{cal}} \quad \text{(Equation 2)}$$

The "K"-factors are obtained from $$\frac{K_x}{K_{cal}} = \frac{\rho_{cal}C_{pcal}N_x}{\rho_x C_{px}N_{cal}} \quad \text{(Equation 3)}$$

where the N's are "structure" factors for the gas which depend to a first approximation on the number of molecules in a gas (for 1, 2, 3, many atoms), $\rho$ is the density of the gas. It has been shown that real gases, even some relatively simple ones, do not follow this equation. A correction function $f(Q_M)$ is required instead. Constant correction factors can be implemented in analog electronics by adjusting gains, but applying a correction function in real time will require a microprocessor.

At zero flow the temperature profile along the tube is symmetric about the heater coil. When gas is flowed through the tube, heat is carried from the center of the heated section in the direction of the flow, resulting in a skewed temperature profile as shown above.

The formulation given above is based on a number of simplifying assumptions. One, the average velocity of flow, the conductivity, the density, the viscosity, and the specific heat of the gas are constant over the temperature range employed in the sensor. Two, when converting from one gas to another, these quantities have the same temperature dependence as the calibrating gas.

It is appreciated that in some prior art devices, heater coil 19 is not physically present but its function is incorporated in coils 17 and 18 and the heating function is provided by coils those 17 and 18. In that instance, the curves, as exemplified by curves 27 and 28 of FIG. 3, will be different in shape, however, $\Delta T$ reading will still provide an indication of the amount of gas flow through tube 15, and, therefore through device 10. Other configurations that have been used include using the sensor tube itself as the heater by passing an electrical current through the tube through clamps located at the ends of the tube. Operation of the temperature sensors 17 and 18 (remain substantially the same.

For the most part prior art mass flow controllers are implemented using analog electronics. Analog electronics have an advantage in that they are inherently "real-time", but implementation of correction functions and other features in analog electronics is impractical. These impracticalities are removed once a microprocessor is incorporated, which is the case of the present invention.

In operation, the prior art device 10 of FIG. 1 provides an output $\Delta T$ which is directly related to the amount of gas flow through meter 11. Because parameters associated with the physical design related to the gas flow in device 10 are fixed and/or known, $\Delta T$ provides an indication of the of gas flow and, hence, the amount of gas flowing. When the type of the gas is known, $\Delta T$ provides a reading of the mass of the gas being provided to the processing chamber. Thus, with the gas and circuit parameters known, it is readily easy to determine the mass flow of the gas by knowing the $\Delta T$ value from device 10. The flow adjustment provided by valve 31 can be made to respond to any changes in this $\Delta T$. Valve 31 can be adjusted to provide a desired $\Delta T$. Preferably a flow adjust control signal can be made to respond automatically to maintain a desired $\Delta T$.

In many instances, the $\Delta T$ signal is coupled to a monitoring unit, or even a processor. However, as used in the prior art, the processor or the monitoring unit provides the necessary intelligence to respond to various stimuli inputs. In the particular instance, the processor receives the stimulus in way of a $\Delta T$ signal, evaluates it and provides an output to control the flow adjust. Where a number of devices are required in a manufacturing environment, the processor is typically a multi-channel mass flow controller, where numerous inputs are provided by a plurality of devices. Partly for these reasons, flow control devices have been kept simple and "non-intelligent".

Some of the other disadvantages encountered in prior art mass flow controllers are described below. Such disadvantages are lack of self-check capability; lack of some form of in-situ calibration to minimize effects of calibration (in-situ calibration is needed because removing the mass flow controller from the tool for calibration results in down-time of some significance from the tool); lack of a method for auto-zero effects of zero drift; lack of a means for correcting for zero to minimize ambient conditions. Furthermore, better linearity is preferred (this is an artifact of analog electronics and is not required with digital electronics) and for some applications a more versatile operation is desired, such as a programmable soft start or ramp up. Prior art devices also lack on-board diagnostics. In-situ diagnostics would improve tool utilization and avoid needless replacement of mass flow controllers. (It has been shown that a significant percentage of replaced mass flow controllers are functioning properly). Additionally, prior art mass flow controllers age with time and corrective action taken typically requires on board adjustments and in many instances this is performed manually. With analog electronics, the zero and gain adjustments are often interactive, so that "tuning" an analog mass flow controller is an iterative and time-consuming process.

Many existing mass flow controllers have overshoot problems. With shorter processes such as with single wafer processes, where the process time is measured in minutes or seconds rather than hours, overshoot means that the gas pressure is out of control for a substantial fraction of the total process time. It is preferred to utilize an adaptive control scheme that will "learn" the characteristics of the specific system to which it is attached. This will lead to much sharper control. Furthermore, existing analog mass flow controllers are sensitive to cable lengths between the main controller and the mass flow controller. Digital communication will eliminate this problem.

Present Invention

Figure 4:
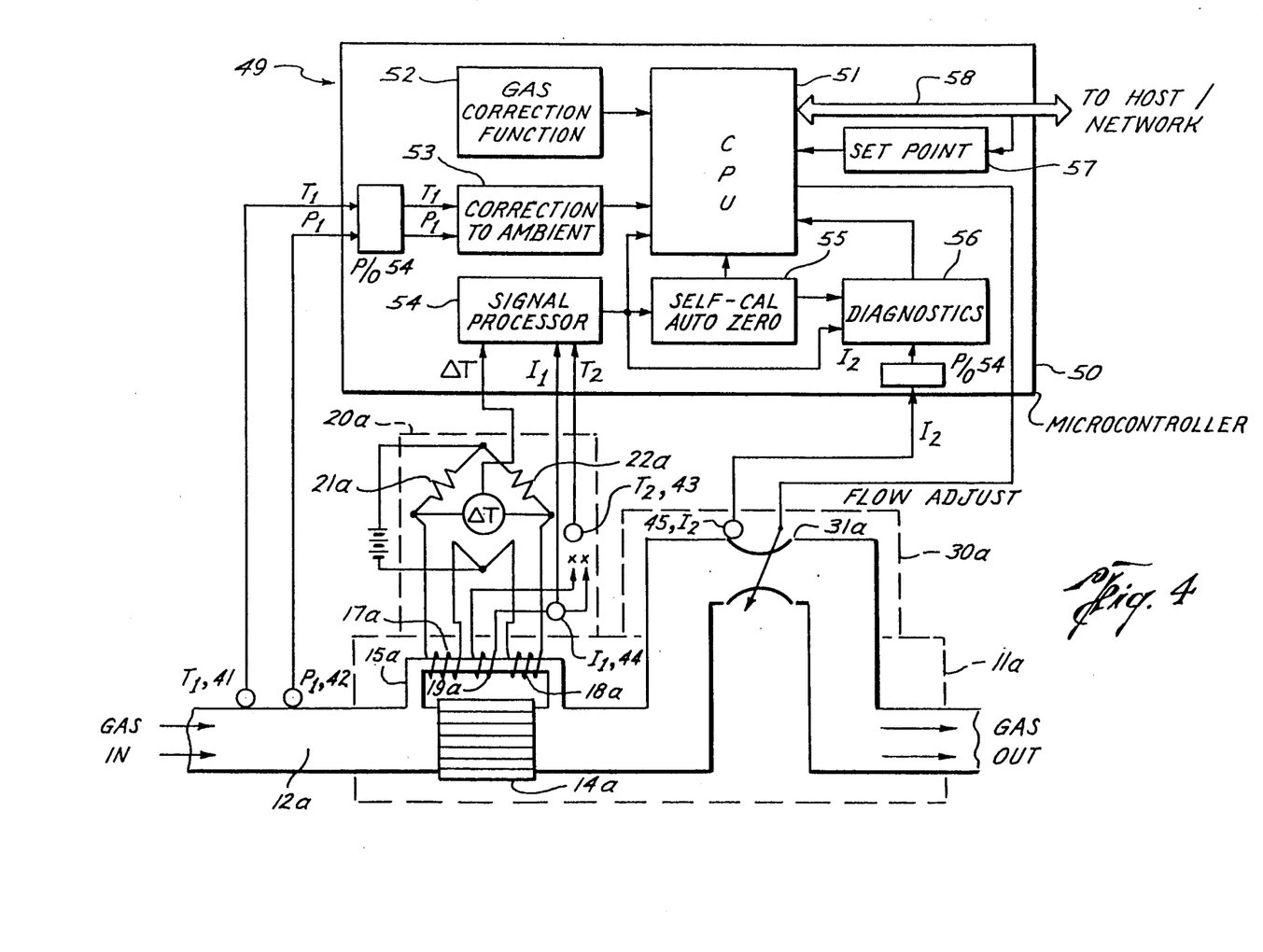
FIG. 4 is a block diagram of an intelligent mass flow controller of the present invention.

Referring to FIG. 4, an "intelligent" mass flow controller (IMFC) 49 of the present invention is shown. IMFC 49 is comprised of four assemblies, namely, flow meter 11a, sensor 20a, flow adjustment unit 30a and microcontroller 50. Assemblies 11a, 20a, and 30a function equivalently to that of like designated elements 11, 20, 30, respectively, described in reference to FIGS. 1-3. Those like elements are designated by having the same reference number, but letter "a" has been added to those elements in FIG. 4. However, as will be noted in FIG. 4, additional monitoring devices are included in these assemblies. Sensor 20a provides a $\Delta T$ signal as an output, wherein ΔT has a value which is indicative of the mass flow of the gas through flow meter 11a.

Additionally, sensor 20a has a current sensing device 44 for measuring the heater current 11 to the heater coil 19a. A temperature sensor 41 to measure the inlet gas temperature $T_1$ and a pressure sensor 42 to measure the inlet pressure P are located at the inlet to the flow meter 11a. A temperature sensor 43 is embedded in the electronic circuits of sensor 20a in order to measure the temperature ($T_2$) of the bridge network (Sensors 41–43 are typically transducers). Some source errors encountered in the prior art, which the present invention overcomes due to these sensors, are described in "Thermal Methods of Flow Measurement"; P. Bradshaw, Journal of Scientific Instruments (Journal of Physics E); 1968 Series 2, Volume 1; pages 504–509.

In reference to unit 30a, a flow adjust signal is coupled to flow adjustment valve 31a which responds to control the size of its opening. Although a variety of valve actuators can be used, the preferred embodiment uses one of two forms of valve actuators. The first is a solenoid in which the position of the valve stem is proportional to the solenoid current. The second is a piezoelectric actuator in which the position of the valve stem is proportional to the actuator voltage. Thus, a sensing device 45 utilized is a current sensing device for solenoid valves or a voltage sensing device for piezoelectric valves. For a given mass flow rate, the valve current (or voltage) would be expected to repeat precisely. A diagnostic routine will then monitor the valve current (or voltage) for a given flow rate. Changes or rate of change over time can be used to anticipate incipient failure of the control valve.

Microcontroller 50 is comprised of a processor (CPU) 51, a signal processor 54 and a number of software routines 52, 53, 55 and 56. A bidirectional bus 58 couples the CPU to the system, typically a host processor and/or network. It is appreciated that microcontroller 50 includes a memory, which memory may be a separate memory or it may be a included as part of the CPU 51, for storing the various software routines along with data. One item of data stored is the setpoint value 57 provided to the CPU 51 from bus 58. Although various arrows are shown as inputs to CPU 51, it is readily evident that such signal inputs may be internal to the CPU 51 or, alternatively, can be provided to and from CPU 51 through bus 58.

In operation, input temperature and pressure readings $T_1$ and $P_1$, are coupled to the correction to ambient routine 53 after being processed by signal processor 54. Signals ΔT, I and $T_2$ from flow meter 11a and sensor 20a are also coupled to the signal processor 54. Current reading $I_2$ is coupled from the diagnostics routine 56, after being processed by signal processor 54, while the flow adjust signal to control valve 31a is provided by the CPU 51. The output of the signal processor 54 is coupled to the CPU 51 and is also coupled to the self-calibration auto zero routine 55 and to the diagnostics routine 56. The output of the of the self-calibration routine 55 is also coupled to the diagnostics routine 56. The purpose of microcontroller 50 is to receive various inputs relating to the environment in order to make "on the fly" corrections to maintain the desired gas flow. Furthermore, microcontroller 50 maintains a record of operating data over time in order to correct for long term changes occurring to various devices of IMFC 49 and detect incipient failure.

The diagnostics routine 53 operates on two levels. The first to provide self-diagnostics of the sensor and electronics of unit 20a and the valve 31a. The second is to provide system diagnostics that monitor other flow controllers and pressure sensor in the system (as will be discussed below). The $T_1$ and $P_1$ readings provide continuous temperature and pressure information and hence density of the gas at the input. As shown in Equations 3 and 4, the "K" factor for a gas is affected by the densities of that gas. The $T_1$ and $P_1$ reading are provided to the routine 53 such that any fluctuations to the density of the gas at the input are compensated and corrected by routine 53. Accordingly, as input temperature and pressure of the gas at the input changes due to various external conditions the changes will necessarily impact the mass flow. Routine 53 automatically compensates for this change thereby maintaining a substantially constant mass flow of the gas. Thus, routine 53 provides for a dynamic correction to the changes in the ambient which can cause changes in the mass flow of the gas. Routine 53 also monitors and corrects for changes in the electronics and signal processing circuitry due to changes in the ambient.

For the system diagnostics routine 53, the IMFC 49 will be configured as a part of a sensor network. The IMFC 49 will act as an "object" in the sense of an object in object-oriented programming. The IMFC 49 will send and receive messages and it will recognize messages on the network that are related to its function. Some of these messages, for example, process chamber pressure, will be used in self-diagnostics and self-calibration routines.

At a programmed flow rate in the networked system, a pressure rise in the system would be compared with the expected value and any necessary correction to span computed and corrected for. When more than one IMFC 49 is operating at the same time to make up process gas mixtures, each IMFC 49 would read the flowrates of the other IMFCs 49 from the network and calculate the total system pressure expected for the total gas flow and given pumping speed. Any deviations would be reported to the system host.

The purpose of the gas correction function routine 5 is to provide a mathematical function for each given type of gas utilized in the manufacturing process, such that IMFC 49 can be readily used with a variety of gases.

As a practical matter, IMFC 49 will be calibrated with inert, non-corrosive gases. Current practice is to adjust the inert gas calibration to match the gas for which the particular IMFC 49 is intended to be used by calculating a new calibration factor $K_X$ that takes into account the specific heat $C_P$ the density $\rho$, and an "N" factor related to the molecular structure of the gas $$K_x = K_{cal} \times \frac{\rho_{cal} C_{P_{cal}} N_x}{\rho_x C_x N_{cal}} \qquad \text{(Equation 4)}$$

where the subscripts refer to the calibrating gas and the gas for which the IMFC is intended to be used, respectively.

This procedure works reasonably well with monoatomic and some diatomic gases at the 2 to 5% level of accuracy, but experience has shown that it is inadequate for more complex gases or for improved accuracy. Hinkle and Mariano (Hinkle, L. D. and Mariano, C. F., "Towards Understanding the Fundamental Mechanisms and Properties of the Thermal Mass Flow Controller", 37th AVS Symp., Toronto, October 1990) have shown that for even relatively simple gases, the conversion factor should be replaced with a gas correction function that is a function of flow rate. In the IMFC 49 the gas correction function can be downloaded from the host during the system initialization. This mathematical function, which may be, but is not limited to, a power-series polynomial will be calculated and applied in the routine 52. In the unlikely case that the relationship cannot be expressed as a function with the required accuracy, then routine 52 will have provisions for storing a look-up table and an interpolating routine to calculate the gas correction function.

The signal $\Delta T$ is provided as an output from the balanced bridge network comprised of coils 17a and 18a, and resistor elements 21a and 22a.

In the prior art, the bridge and associated electronic circuits of unit 20 are typically operated as D.C. circuits. There are substantial advantages, however, to converting the bridge to an A.C. (alternating current) bridge. Because of the superior sensitivity and noise rejection qualities of phase-locked detectors, the sensitivity of the bridge can probably be improved by at least one order of magnitude over D.C. operation. Furthermore, by employing a simple ratio transformer rather than the ratio resistors 21a and 22a, the sensitivity of the bridge and detection electronics to drift due to aging of the ratio resistors and ambient changes can essentially be eliminated. The art of the A.C. bridge has been extensively developed in the area of precision platinum resistance thermometry. A.C. bridges are used in capacitance manometers. The increased sensitivity and accuracy obtained by using A.C. bridge technology with a phase-sensitive detector will provide both improved accuracy and wider range of operation for the IMFC 49 of the present invention. (See "Standard Cell Enclosure with 20-$\mu$K Stability"; Cutkosky, R. D. and Field, B. F.; IEEE Transactions on Instrumentation and Measurement; Volume IM-23, No. 4, December 1974; pages 295-298.)

As described above, the purpose of $\Delta T$ is to provide the mass flow of the gas. The signal $T_2$ provides a measurement of the bridge and electronic circuitry of unit 20a. This measurement will be used by the signal processor 54 to correct the output of unit 20a for ambient temperature effects. The heater current reading I provides an accurate reading of the heater current and, thus, the amount of heat generated by the heater coil 19a.

Because on he $\Delta T$ value for a given gas is dependent on the amount of heat energy provided to the gas by heater coil 19a, which heat energy is a function of the current provided to heat coil 19a, it is important that the heater current $I_1$ be tightly monitored to maintain a tight tolerance.

There are two preferred operating modes for the mass flow sensor 20a: 1) constant heater current and measured $\Delta T$, or 2) constant $\Delta T$ and controlled and measured heater current. The first mode is the simpler to implement, since the heater current must only be controlled to a fixed and constant value. In the second mode the heater current is controlled by requiring the measured $\Delta T$ to remain constant. In this mode the current and $\Delta T$ measurements are linked together. This tends to be more precise, since the bridge is kept to a null balance. The noise rejection properties of the null-balance circuit is superior to trying to measure very small signals accurately. Any off-null signal causes a proportional adjustment in the heater current to bring the bridge back into balance. The heater current, being a much larger signal can be made more noise immune than the small signal $\Delta T$ used in the first mode.

In the first mode the off-balance signal from the bridge is used as the measurement of the flowrate and is input to the valve control circuit. In the second mode, the heater current is monitored and is used as a measure of the flowrate. It is to be noted that although two schemes for the operation of the heater in unit 20a are described, other schemes can be readily implemented.

The self-calibration auto-zero routine 55 is utilized to self-calibrate the IMFC 49 during initialization. With valve 31a closed, the mass flow parameters are measured utilizing routine 55. This should be substantiated by the fact that $T_1$ should equal $T_2$. If corrections are required, then those corrective values are calculated and implemented. Then, such self-calibration measurements and correction factors are recorded (stored) by CPU 51. Furthermore, the diagnostics routine 56 causes the current value $I_2$, to be recorded (assuming that valve 31a is electrically operated, such as by a solenoid), in order to maintain a historical record of the solenoid current over time. The primary purpose of routine 56 is to provide diagnostics and to maintain a record of various circuit parameters over time in order to correlate these figures to determine the aging of the various devices. When the measured parameter values reach a predetermined point, which point is undesirably distant from the initial value, a signal is provided from the CPU 51 to notify the host that repair or replacement is needed for a particular device.

Because IMFC 49 of the present invention is an intelligent device, minimal communication need occur between it and the host processor or network. During operation, the host will transmit to microcontroller 50 by databus 58, the setpoint information for a particular gas which is to be utilized. The setpoint information is stored and provided to CPU 51. Prior to or upon receiving this information, microcontroller 50 initiates its initialization routines an then selects the proper gas correction function for the given gas in use. This function is matched to the setpoint information to establish an operating point for IMFC 49. The flow adjust signal from the CPU activates valve 31 to the desired opening to establish the desired gas flow. Finally, all circuit parameters are monitored and checked to determine if any other corrections are needed by CPU 51. Once the desired flow level has been established, then, CPU 51 transmits a confirmation signal back to the host unit to inform the host unit that the desired operating point has been reached and the desired mass flow of the gas is being provided to the semiconductor processing chamber.

One main advantage of utilizing the intelligent mass flow controller of the present invention is that the processing required to operate the mass flow controller is removed from the host unit and decentralized. (This assumes that the host is capable of such processing.) The host need not participate in the continuous monitoring of the operating parameters. The host only needs to check confirmation signals ("flags") that acknowledge proper functioning of the IMFC 49. This decentralization of the controlling intelligence frees the host to perform other functions and, further, permits a plurality of these units to be coupled to the host and/or network without burdening the host and/or network with the continual monitoring tasks.

In reference to the signal processor 54, it is to be noted that it may be implemented by a variety of hardware devices, such as a phase-locked loop circuitry, or a combination of hardware and software. Furthermore, it is to be appreciated that although the IMFC 49 is described in reference to controlling gas, it could be readily adapted to control liquids as well.

Functional Description for the IMFC

Although the IMFC 49 of the preferred embodiment can operate as a single unit, the preferred use is to tie a plurality of such IMFCs into a system level scheme. Accordingly, the following description identifies and describes three levels of operation for the preferred IMFC system. However, it is appreciated that although a preferred example is described other systems and system functions can be readily practiced without departing from the spirit and scope of the present invention.

In the system scheme, a plurality of IMFCs 49 are coupled to bus 58 and communicate with the host processor. Other monitoring and controlling devices, such as pressure transducers, are also coupled to bus 58 to communicate with the host. Each IMFC in the system is capable of operating in one of three modes of operation. These three modes are actually levels of operation and defined from top down as 1) host or process system level, 2) network level and 3) sensor level.

In the system level of operation, the system will function in one of five moves of operation which are initialization, runtime, data logging, diagnostic and alarm. The description of each is presented below.

In the initialization mode the host or system controller will send a global request for each sensor on the network to return its identification and status. The system will then compare the existing configuration with that specified to ascertain that the sensor configuration matches that required for the process. The sensor status check will confirm that the sensor system is ready to operate or for update. Then, after confirming the status of the existing system, the host can proceed to update any information required by the sensors to run the next process. This may be new set points for the next process steps to be run, new control parameters, such as gas flow ramp rates, etc.

In the runtime mode the host will send process step identification, start and stop commands. After sending the start command, the host will monitor in sequence the "command received" handshake and confirm that the proper command was received error free and monitor the "operating OK" flag that is held high by each sensor during operation according to the pre-loaded process parameters. The host will also monitor an alarm flag that will be turned on by the sensor if self-checks detect any malfunction in itself or other 'partnered' sensors.

In the data logging mode the host will command the processors to store locally measured process parameters on a continuous basis at a prescribed sampling frequency. At the end of the process, the host can upload the logged data from each sensor and allow the sensors to delete the local logged data file.

In the alarm mode, when the host detects a sensor alarm, the host will signal the operator and depending on preprogrammed information that will rate the seriousness of the failure of the sensor will in order of severity: Signal the operator; continue processing, but flag the batch or wafer as requiring inspection; institute an orderly system shutdown; and institute an emergency system scram.

In the diagnostic mode the host will instruct the sensors to perform their self-diagnostic routines and report the results. The host will evaluate the responses and signal the operator if any of the sensors require attention.

The network shall consist of a network controller coupled to the bus 58 to monitor the network traffic for the purpose of providing the network level of operation. Since the network will not have to accommodate large quantities of real-time information, it can be a moderate speed (such as a wire serial bus) connecting all the sensors in parallel instead of bus 58. Parallel networking of the sensors is essential to realize the full potential of the IMFC's, since each sensor will listen or eaves-drop to the other sensors in the system as a part of their local self-check routines. A data bus similar to that used by 8031 or 8051 controllers (which controllers are manufactured by Intel Corporation of Santa Clara, Calif.), or like controllers, are suitable and can be readily adapted. The network controller will recognize priority signals such as alarms and forward them immediately to the host.

Complete implementation of the IMFC network system requires that a system pressure transducer also operate as an object in the IMFC network. To fully implement the IMFC system, parallel development of an intelligent pressure transducer will be required. Since, in fact, this may not occur in parallel, an interim solution would be for the network controller to simulate this function. The network controller would take the signal from the pressure transducer and convert it into the object message form required for the IMFC network. Eventual development of an intelligent pressure transducer would be facilitated since the intelligent functions incorporated in the network controller could be easily migrated to the pressure transducer.

With the pressure transducer included as a part of the IMFC network system, the in-situ calibration of the IMFC's can also be incorporated. There are existing calibration systems for in-situ calibration of MFC's, however, these require attachment of additional equipment and a separate host and control system. With the pressure transducer as a part of the IMFC network, the in-place calibration of the IMFC's can be carried out as an activity separate from the process, or single point confirmation checks can be made of the calibration during processing.

In the sensor level operation, the IMFC will include a number of functions which are described below.

1. Sensor Identification: After a remote query from host controller the sensor will return unique identification 10 code and may include manufacturer's model number, range, gas type, system location, and current calibration constants.

2. Self-Calibration: At zero flow, sensor zero can be measured and compared with the stored value previously measured. Any drift can be corrected by modification of the current calibration constants. At a programmed flow rate in the networked system, the pressure rise in the system would be compared with the expected value and nay necessary correction to span computed and corrected for. When more than one IMFC is operating at the same time to make up process gas mixtures, the IMFC would read the flowrates of the other IMFCs from the network and calculate the total system pressure expected for the total gas flow and given pumping speed.

3. Adaptive Control: IMFC will learn the response of the system to changes in flowrate and adjust its operation to optimize the operation of the control valve.

4. Signal Processing: Selectable methods of sampling and averaging, for example, number of samples per average, running average, window average.

5. Calibration Data: Calibration constants will be stored internally. In addition, old calibration constants will be dated and stored. Review of the calibration history will be a part of the self-diagnostics.

6. Network Communications: The IMFC will be configurable in a sensor network. The IMFC will become an "object" in a hardware analog of Object-Oriented Programming. The IMFC will send and receive messages. It will recognize messages on the network that are related to its function. Some of these messages, for example, process chamber pressure, will be used in self-diagnostics and self-calibration routines. The IMFC will receive its set point from the host over the network and will return an "OK" on query or send an alarm if something goes wrong.

7. Failure Prediction: This is a part of self-diagnosis. Monitoring change in calibration discovered by the autocal routine, out-of-tolerance values of the control valve current, or an indication of an incompletely closed valve.

8. Remote Adjustment: Range and span can be adjusted within the physical limits of the IMFC from the host controller. It will require no mechanical or electrical adjustments.

9. Inlet gas and pressure sensors will be measured and the results used for compensation of flowmeter output.

Thus, an intelligent mass flow controller and a system scheme for such a controller are described.

I claim:

1. An apparatus for controlling a mass flow of a gas for use in semiconductor processing comprising:
   gas metering means having laminar flow coupled to receive said gas at its inlet and for providing a metered flow of said gas at its outlet;
   regulating means coupled to said metering means for regulating said flow of said gas provided at said outlet of said metering means;
   flow sensing means coupled to said metering means to sense said flow of said gas through said metering means;
   a temperature sensor coupled to the inlet of said gas metering means to measure temperature of said gas entering said gas metering means;
   a pressure sensor coupled to the inlet of said gas metering means to measure pressure of said gas entering said gas metering means;
   processing means coupled to receive gas flow information from said sensing means which is indicative of the flow of said gas and coupled to receive temperature and pressure information from said temperature and pressure sensors;
   said processing means also coupled to provide a control signal to said regulating means for controlling a position of said regulating means to provide a desired gas flow from said regulating means;
   said processing means further including a software routine stored in its memory for automatically processing said gas flow, temperature and pressure information and adjusting said gas flow based on said temperature and pressure information to correct for ambient variations in order to maintain a selected mass of said gas to flow;
   said processing means also including a calibration software routine to provide automatic, in-situ, in process calibration of said gas metering means during initialization of said apparatus.

2. The apparatus of claim 1 wherein said processing means further includes a diagnostic software routine to periodically monitor selected parameters pertaining to said apparatus over time, storing such periodically monitored parameter information and comprising said stored information to determine changes of said selected parameters over time.

3. The apparatus of claim 2 wherein said flow sensing means includes a balanced bridge network to measure a difference of temperature across a flow sensing tube to determine said gas flow.

4. A mass flow controller (MFC) for controlling a mass flow of a gas being introduced into a device utilized for semiconductor processing comprising:
   a gas flow meter having laminar flow coupled to received said gas at its inlet and providing a metered flow of said gas at its outlet;
   a flow valve coupled to said gas flow meter for regulating said flow of said gas provided as a gas flow output to said device;
   a sensing circuit coupled to said gas flow meter to sense said flow of said gas through said gas flow meter;
   a temperature sensor coupled to the inlet of said gas flow meter to measure temperature of said gas entering said gas flow meter;
   a pressure sensor coupled to the inlet of said gas flow meter to measure pressure of said gas entering said gas flow meter;
   a processor coupled to receive a signal from said sensing circuit which signal is indicative of the rate of flow of said gas and coupled to receive temperature and pressure information from said temperature and pressure sensors;
   said processor also coupled to provide a control signal to said flow valve for controlling a position of said flow valve to provide a desired gas flow from said flow valve;
   said processor further including a software routine stored in its memory for automatically processing said gas flow, temperature and pressure information and adjusting said gas flow based on said temperature and pressure information to correct for density variations of said gas at said inlet in order to maintain a selected mass of said gas to flow to said device;
   said processor also including a calibration software routine to provide automatic, in-situ, in process calibration of said flow valve during initialization of said MFC.

5. The MFC of claim 4 wherein said processor further includes a diagnostic software routine to periodically monitor selected parameters pertaining to said MFC over time, storing such periodically monitored parameter information and comparing said stored information to determined changes of said selected parameters over time.

6. The MFC of claim 4 wherein said processor further includes a sensor compensation software routine in which a drift of said sensing circuit is determined and compensated.

7. The MFC of claim 4 wherein said sensing circuit includes a balanced bridge network to measure a difference of temperature across a flow sensing tube to measure said gas flow.

8. A mass flow controller (MFC) which is self-contained for controlling a mass flow of a gas being introduced into a semiconductor processing equipment comprising:

- a gas flow meter having laminar flow coupled to receive said gas at its inlet and providing a metered flow of said gas at its outlet;
- a flow valve coupled to said gas flow meter for regulating said flow of said gas provided as a gas flow output to said processing equipment;
- a sensing circuit coupled to said gas flow meter to sense said flow of said gas through said gas flow meter;
- said sensing circuit including a balanced bridge network to measure a difference of temperature across a flow sensing tube to determine said gas flow.
- a temperature sensor coupled to the inlet of said gas flow meter to measure temperature of said gas entering said gas flow meter;
- a pressure sensor coupled to the inlet of said gas flow meter to measure pressure of said gas entering said gas flow meter;
- a processor coupled to receive a signal from said sensing circuit which signal is indicative of the rate of flow of said gas and coupled to receive temperature and pressure information from said temperature and pressure sensors;
- said processor also coupled to provide a control signal to said flow valve for controlling a position of said flow valve to provide a desired gas flow;
- said processor further including a software routine stored in its memory for automatically processing said gas flow, temperature and pressure information and adjusting said gas flow based on said temperature and pressure information to correct for density variations of said gas at said inlet in order to maintain a selected mass of said gas to flow to said processing equipment;
- said software routine further including a calibration routine to provide automatic, in-situ, in process calibration of said flow valve during initialization of said MFC.

9. The MFC of claim 8 wherein said processor further includes a diagnostic software routine to periodically monitor selected parameters pertaining to said MFC over time, storing such periodically monitored parameter information and comparing said stored information to determine changes of said selected parameters over time.

10. The MFC of claim 9 wherein said processor further includes a sensor compensation software routine in which a drift of said sensing circuit is determined and compensated.

11. The MFC of claim 10 wherein said processor is coupled to a host controller and wherein said host controller remotely monitors said MFC.

12. The MFC of claim 11 wherein said host controller is capable of programming said MFC remotely.

13. The MFC of claim 12 wherein a plurality of such MFCs are coupled to transmit information on a bus in order to communicate with said host controller and with other of said MFCs.

14. The MFC of claim 13 wherein each MFC includes an adaptive routine which learns the specific tool on which it is installed.

15. The MFC of claim 14 wherein each MFC's diagnostic routine is capable of being activated by said host controller.

16. The MFC of claim 15 wherein said host controller is a computer.

17. The MFC of claim 8 wherein said processor includes a routine for making mathematical gas correction function for the particular gas flowing through said flow meter.

18. The MFC of claim 17 wherein said bridge network is an alternating current ratio transformer bridge with a phase sensitive detector.

* * * * *

UNITED STATES PATENT AND TRADEMARK OFFICE
CERTIFICATE OF CORRECTION

PATENT NO. : 5,062,446
DATED : November 5, 1991
INVENTOR(S) : Richard L. Anderson It is certified that error appears in the above-identified patent and that said Letters Patent is hereby corrected as shown below:

Column 1, line 40, "valve" should be --value--.
Column 1, line 58, ":>" should be --,--.
Column 5, line 46, "(remain" should be --remains--.
Column 6, line 23, before "effects" insert --to minimize--.
Column 7, line 4, numeral "11" should be --$I_1$--.
Column 7, line 7, "P" should be --$P_1$--.
Column 7, line 52, "I" should be --$I_1$--.
Column 8, line 43, numeral "5" should be --52--.
Column 9, line 47, "I" should be --$I_1$--.

Signed and Sealed this

Seventeenth Day of August, 1993

Attest:

Attesting Officer

BRUCE LEHMAN

Commissioner of Patents and Trademarks